United States Patent [19]

Burke

[11] Patent Number: 4,939,440

[45] Date of Patent: Jul. 3, 1990

[54] FRICTION-COMPENSATING MASS MOTION CONTROLLER

[75] Inventor: Edward F. Burke, Lake Oswego, Oreg.

[73] Assignee: Tektronix, Inc., Beaverton, Oreg.

[21] Appl. No.: 445,579

[22] Filed: Dec. 4, 1989

[51] Int. Cl.$^5$ .............................................. G05B 13/00
[52] U.S. Cl. .................... 318/646; 318/434; 318/561; 400/322; 400/320
[58] Field of Search ................... 318/560–646, 318/280–284, 420–434; 400/320, 322

[56] References Cited

U.S. PATENT DOCUMENTS

| | | | |
|---|---|---|---|
| 3,916,279 | 10/1975 | Kawano et al. | 318/436 X |
| 4,605,887 | 8/1986 | Boella et al. | 318/594 |
| 4,606,489 | 8/1986 | Steinhart et al. | 318/618 X |
| 4,680,520 | 7/1987 | Toyoda et al. | 318/594 |
| 4,694,229 | 9/1987 | Cormack | 318/561 |
| 4,698,566 | 10/1987 | Okamura | 318/434 X |
| 4,777,609 | 10/1988 | Cavill et al. | 400/322 X |
| 4,869,610 | 9/1989 | Nishizawa et al. | 400/322 |

Primary Examiner—William M. Shoop, Jr.
Assistant Examiner—Paul Ip
Attorney, Agent, or Firm—Edward B. Anderson

[57] ABSTRACT

A motion controller for the head carriage of an ink jet printer comprises a target signal generator providing constant velocity reference input to a servo loop controller. Also, two levels of current are applied to the drive motor during direction reversal, a lower one during deceleration of the carriage, and a higher one during acceleration of the carriage. The timing of the two current levels is determined by inputting a rectified velocity signal into a slope detector. A comparator converts the output of the slope detector into a binary signal for controlling the motor current level.

11 Claims, 2 Drawing Sheets

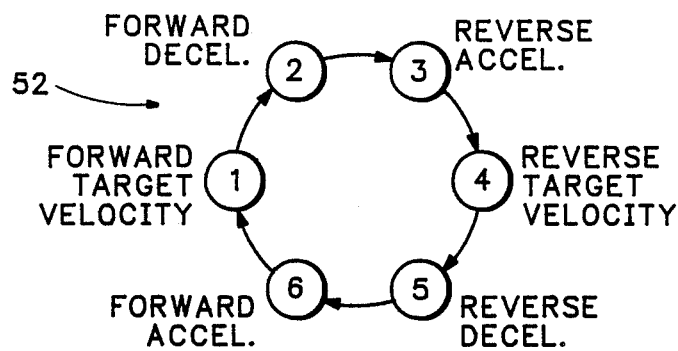
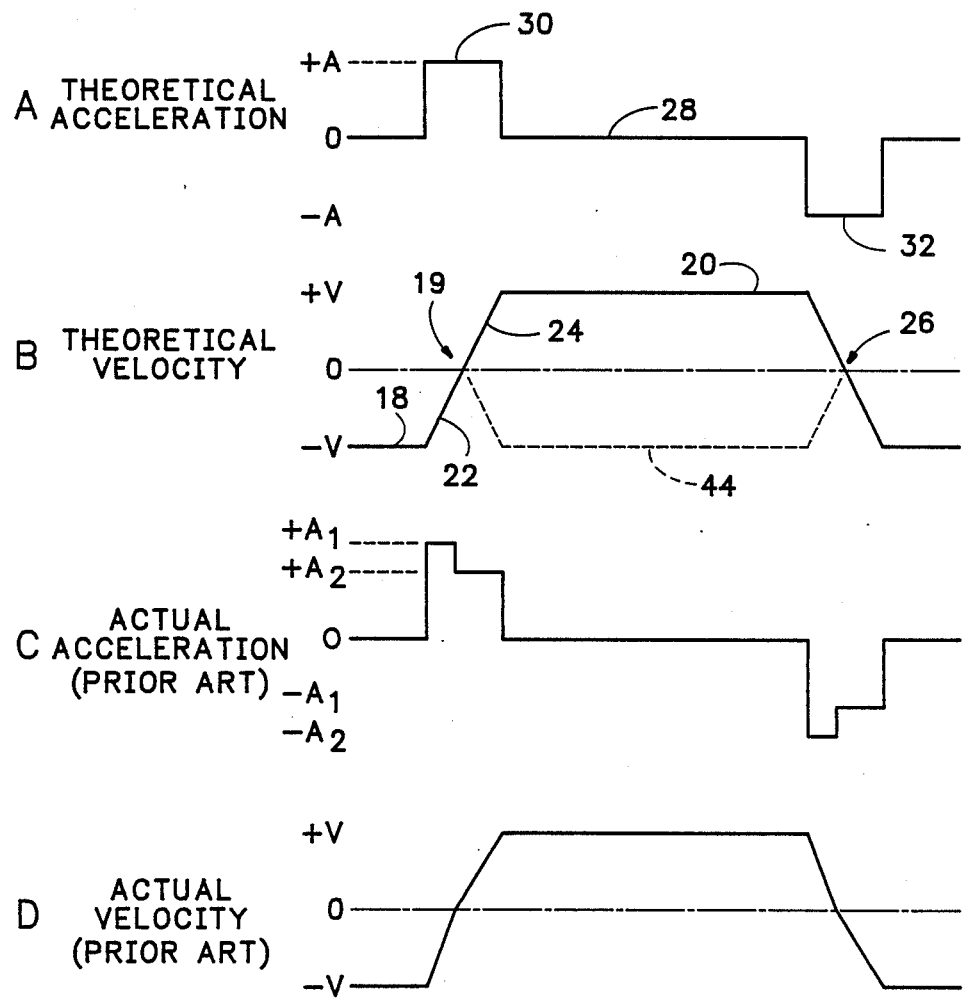
FIG. 4

FRICTION-COMPENSATING MASS MOTION CONTROLLER

FIELD OF THE INVENTION

This invention relates to a motor controller for moving a mass, such as a printer carriage, reciprocatingly along a predetermined path, and in particular, to such a controller for controlling a drive motor in a manner compensating for friction during mass travel direction reversals.

BACKGROUND OF THE INVENTION

The preferred embodiment of the present invention is particularly directed to a system for moving an ink jet printer back and forth along a guide bar for scanning a print medium on which an image is printed. In general terms, the underlying invention is applicable to a system for moving reciprocatingly a mass along a predetermined surface. It will be understood in the following description that although reference is made to the ink jet printer environment, the invention is not limited to this application.

A carriage motion controller is generally a four state device. One state is movement left at a constant velocity. A second state is left reversal in which the velocity of the carriage is reversed. A third state is movement right at a constant velocity. The fourth state is right reversal in which the velocity of the carriage is again reversed. Conventional control schemes are variously described in "Closed Loop Operation of Step Motors", *Warner Electric's Guide to Selecting and Controlling Step Motors*, 1979, pages V-1 to V-21; Regnier et al., "Starting Brushless DC Motors Utilizing Velocity Sensors", *Incremental Motion Control Systems and Devices*, Fourteenth Annual Symposium of the Incremental Motion Control Systems Society, June 1985, pp. 99–107; and Petrick, "Microprocessor Stepper Motor Drive", U.S. Pat. No. 4,648,026 issued Mar. 3, 1987.

The constant velocity states are maintained by controlling a drive motor by a velocity servo. During reversals, the drive motor is driven by a constant current source. With a DC drive motor, constant current results in constant torque, which, ideally, produces constant deceleration and acceleration. As also used herein, deceleration is considered negative acceleration, with acceleration being a general term encompassing both positive and negative values.

This scheme does not compensate for the effects of friction forces on the printer carriage. Friction assists deceleration but hinders acceleration. Thus, the theoretical expectation of accomplishing deceleration and acceleration during velocity reversal over equal travel distances of the carriage is not satisfied. In one application, for instance, it has been found that the carriage decelerates to zero velocity over a distance of about 0.75 inches. The carriage accelerates to the design speed of 33.33 inches per second over a distance of about 1.25 inches. This requires that the printer be wide enough to accommodate the longer distance at each end of the printer carriage scan in order to reach design speed before beginning printing.

It is therefore desirable to have a more narrow printer in order to reduce overall size as well as cost. More specifically, it is desirable to accelerate the carriage at an actual rate that is the same as the actual rate of deceleration.

SUMMARY OF THE INVENTION

The present invention overcomes these disadvantages of the prior art. In particular, the present invention provides a mass motion controller that applied a torque to the mass that is greater during acceleration than deceleration. This allows torque values to be chosen that compensate for the friction of the mass on the surface on which it rides. The result is that the mass can be accelerated over the same distance that deceleration occurs.

Generally, the present invention provides a system and method for controlling the reciprocating movement of a mass along a predetermined surface by a motor coupled to the mass and responsive to a control signal. The system comprises means for generating a signal representative of the movement of the mass along the surface. The movement signal includes a deceleration portion and an acceleration portion representative of a direction reversal of the mass on the surface. A motor controller is responsive to the movement signal and is connectable to the motor for generating a motor control signal representative of the movement signal. The motor control signal includes a deceleration portion and an acceleration portion corresponding to the deceleration portion and the acceleration portion, respectively, of the movement signal, with the deceleration portion producing less torque output of the motor than the acceleration portion.

In the preferred embodiment of the invention, the movement signal generating means generates a six-state movement signal including a first state representative of a target velocity in a first direction, a second state representative of a deceleration in the first direction, a third state representative of acceleration in the direction reverse to the first direction, a fourth state representative of a target velocity in the reverse direction, a fifth state representative of deceleration in the reverse direction, and a sixth state representative of acceleration in the first direction. The motor controller generates the motor control signal with a state corresponding to each state of the movement signal. The first and fourth states are constant velocity signals associated with servo control, the second and fifth states are constant current signals of a first predetermined amplitude for decelerating the mass. The third and sixth states are constant current signals of a second predetermined amplitude for accelerating the mass. The first predetermined amplitude is sufficiently less than the second predetermined amplitude to substantially compensate for the friction between the mass and the surface, whereby the mass decelerates and accelerates over substantially equal distances of the surface.

It can be seen that the present invention provides a controller that provides for separate control of acceleration and deceleration. This allows for augmenting the torque applied during acceleration to compensate for friction. More generally, acceleration and deceleration can be designed to occur over a predetermined distance or distances. Thus, a narrower, and therefore less expensive printer can be produced. This also provides, as a result, reduced print cycle time.

These and other features and advantages of the present invention will become apparent from a reading of the following detailed description of the preferred embodiment with reference to the associated drawings.

BRIEF DESCRIPTION OF THE DRAWINGS

FIG. 3 is a general diagram of the six-state machine of FIG. 2.

FIG. 4 illustrates four wave forms of theoretical and actual acceleration and velocity of a mass in reciprocating motion on a friction surface.

DETAILED DESCRIPTION OF THE PREFERRED EMBODIMENT

Figure 1:
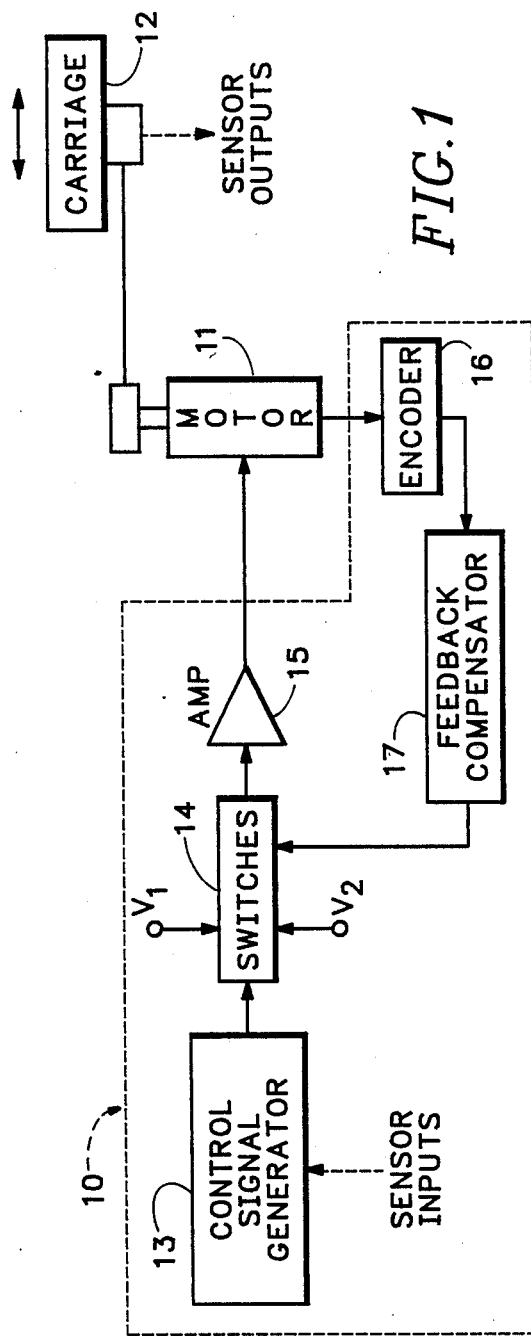
FIG. 1 is a block diagram of a carriage motion controller made according to the present invention.

Referring initially to FIG. 1, a motor control apparatus 10 forming, in part, a velocity servo, and made according to the present invention, drives a DC motor 11 coupled to a printer carriage 12 that moves back and forth along a guide bar (not shown). A more complex controller is described in my copending U.S. patent application having Ser. No. 07/297,202 filed Jan. 17, 1989 entitled "Mass Velocity Controller". Apparatus 10 comprises a control signal generator 13 that outputs a control or movement signal in response to desired and actual carriage movement. An ideal velocity profile is represented by wave form B in FIG. 4. During constant velocity portions, such as portion 18, the velocity signal is combined with the inverse of a feedback signal at a switch network 14. The resultant error signal is applied to motor 11 through a power amplifier 15. The motor response is sensed by an encoder 16. The encoder generates a feedback signal that is adjusted by a feedback compensator 17 prior to being combined with the control signal at switch network 14.

Wave form B in FIG. 4 includes a constant velocity portion 18 that corresponds to movement of the carriage in one direction, such as to the right to give this description a common reference. The signal then provides for reversal of directions in a portion 19 that shows a constant slope up to a constant velocity portion 20 going in the reverse or left direction. The constant slope of direction reversal portion 19 indicates that a constant acceleration is applied to the carriage appropriate for reversing the direction of carriage travel.

Portion 19, thus, includes a deceleration or negative acceleration portion 22, existing until the carriage reaches zero velocity. A positive acceleration portion 24 extends from zero velocity to constant velocity portion 20. At the end of portion 20 is a corresponding velocity reversal portion 26. These idealized acceleration portions are shown in wave form A. Zero acceleration portions, represented by portion 28, exist during constant carriage velocity. Acceleration in a relative positive direction, shown by constant acceleration portion 30, corresponds to velocity reversal portion 19. Similarly, constant acceleration portion 32 corresponds to velocity reversal portion 26.

Wave form B of FIG. 4 is the ideal wave form for driving an ideal carriage assembly. However, as has been discussed, friction resists the movement of the carriage. This is compensated for in the constant velocity portions of carriage travel by the velocity servo. During direction reversal, the velocity servo is inactivated at switches 14 by control signals from generator 13 and a constant current is applied to motor 11. Voltage references $V_1$ and $V_2$ correspond to associated resultant motor current levels during deceleration and acceleration, respectively.

Wave forms C and D of FIG. 4 show the actual acceleration and velocity profiles that exist as a result of the influence of friction and the application of the target velocity profile shown as wave form B for a conventional four-state controller. The deceleration ($A_1$) is sped up, since the friction acts to brake the carriage motion. The acceleration ($A_2$) takes longer, since it is retarded. As was mentioned, in one application of this, the deceleration occurred over a distance of 0.75 inches and acceleration required 1.25 inches to reach the target velocity.

Figure 2:
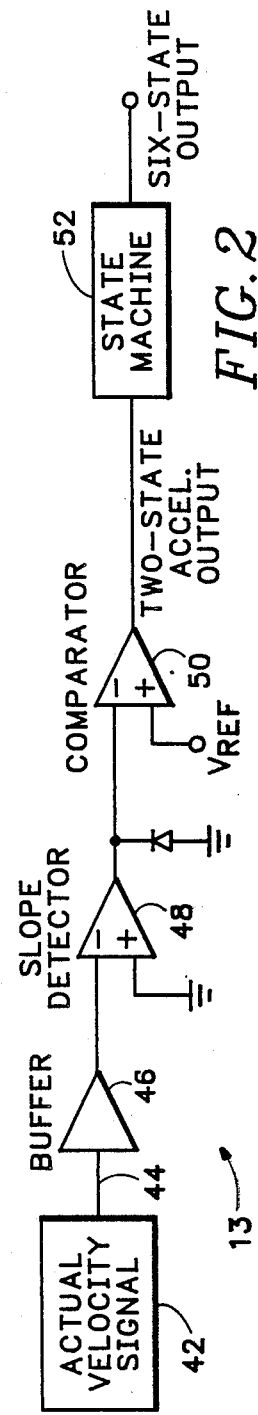
FIG. 2 is a general schematic of a control signal generator included in the controller of FIG. 1 for converting a movement signal into a two-state acceleration control signal.

FIG. 2 shows a partial block diagram of generator 13. The actual carriage velocity is converted into a signal by a generator 42. This voltage signal is represented as an idealized form by wave form B. It then, in effect, full wave rectifies it to produce a single polarity signal 44. This signal is shown as the signal below the zero velocity line associated with wave form B, and includes the signal shown in dashed lines.

Signal 44, which represents the absolute value of the velocity signal, is applied to a buffer amplifier 46. This conditions the signal for input to a differentiation circuit 48 that detects the slope of the velocity signal. This is the key to establishing the separation between deceleration and acceleration. The deceleration portion of signal 44 has a positive slope, and the acceleration portion has a negative slope. The transition from deceleration to acceleration occurs at the point of zero carriage velocity.

The output of differentiation circuit 48 is input to comparator 50 for converting the signal into a pulsed output (digital) signal having pulses of different voltage levels representing the deceleration and acceleration periods. The output of comparator 50 is applied as one of the inputs to a six-state state machine 52. Other inputs, not shown, include signals indicating when deceleration is to begin, such as by carriage position, and when the constant velocity level is reached, such as by carriage velocity.

The state machine output controls the operation of motor 12. FIG. 6 illustrates the cycling of the state machine through the six states of operation of motor 12. In states one and four, a constant velocity is maintained. During states two and five, a first constant current is applied to provide deceleration until zero velocity is reached. During states three and six, a second constant current is applied to provide acceleration from zero velocity to the target velocity. A lower current, such as 2.5 amps (as determined by $V_1$ at switches 14), is applied to the motor during deceleration, and a higher current, such as 4.0 amps (as determined by $V_2$), is applied during acceleration. This is found to neutralize the effects of friction, and produces equal, and therefore symmetrical, deceleration and acceleration distances.

As a result, these distances can be designed to be of independently selected values. This allows for a printer to be narrower (and therefore faster) when economic or other considerations dictate. If special circumstances warranted having the deceleration and accelerations to be other, specified distances, this could readily be accommodated by the present invention, since these distances are individually controlled.

Thus, while the invention has been described with reference to the foregoing preferred embodiment, it will be understood that variations in the form and design of the apparatus may be made without varying from the spirit or scope of the invention as described in the claims.

I claim:

1. A system for controlling the reciprocating movement of a mass along a predetermined surface by a motor coupled to the mass and responsive to a control signal, the system comprising:

means for generating a movement signal representative of the movement of the mass along the surface, the movement signal including a deceleration portion and an acceleration portion representative of a direction reversal of the mass on the surface; and motor control means responsive to the movement signal and connectable to the motor for generating a motor control signal representative of the movement signal, the motor control signal including a deceleration portion and an acceleration portion corresponding to the deceleration portion and the acceleration portion, respectively, of the movement signal, with the deceleration portion producing less torque output of the motor than the acceleration portion.

2. A system according to claim 1 where there is friction between the mass and the surface, the control signal generating means generating the deceleration and acceleration portions of the control signal appropriate for compensating for friction between the mass and the surface.

3. A system according to claim 1 wherein the deceleration and acceleration portions of the control signal are appropriate for substantially equalizing the distances the mass moves on the surface during deceleration and acceleration, respectively.

4. A system for controlling the reciprocating movement of a mass with friction along a predetermined surface by a motor coupled to the mass and responsive to a control signal, the system comprising:

means for generating a six-state movement signal representative of the movement of the mass along the surface, and including a first state representative of a target velocity in a first direction, a second state representative of deceleration in the first direction, a third state representative of acceleration in the direction reverse to the first direction, a fourth state representative of a target velocity in the direction reverse to the first direction, a fifth state representative of deceleration in the direction reverse to the first direction, and a sixth state representative of acceleration in the first direction; and motor control means responsive to the movement signal and connectable to the motor for generating a motor control signal representative of the movement signal, the motor control signal including a state for each state of the movement signal, with the first and fourth states being constant velocity signals, the second and fifth states being constant current signals of a first predetermined amplitude for decelerating the mass, and the third and sixth states being constant current signals of a second predetermined amplitude for accelerating the mass, the first predetermined amplitude being sufficiently less than the second predetermined amplitude to substantially compensate for the friction between the mass and the surface, whereby the mass decelerates and accelerates over substantially equal distances of the surface.

5. A method for controlling the reciprocating movement of a mass along a predetermined surface by a motor coupled to the mass and responsive to a control signal, the method comprising the steps of:

generating a movement signal representative of the movement of the mass along the surface, the movement signal including a deceleration portion and an acceleration portion representative, in combination, of a direction reversal of the mass on the surface; and generating a motor control signal representative of the movement signal, the motor control signal including a deceleration portion and an acceleration portion corresponding to the deceleration portion and the acceleration portion, respectively, of the movement signal, with the deceleration portion producing less torque output of the motor than the acceleration portion.

6. A method according to claim 5 where there is friction between the mass and the surface, the step of generating the control signal includes generating the deceleration and acceleration portions of the control signal appropriate for compensating for friction between the mass and the surface.

7. A method according to claim 5 wherein the deceleration and acceleration portions of the control signal are appropriate for substantially equalizing the distances the mass moves on the surface during deceleration and acceleration, respectively.

8. A method for controlling the reciprocating movement of a mass with friction along a predetermined surface by a motor coupled to the mass and responsive to a control signal, the method comprising the steps of:

generating a six-state movement signal representative of the movement of the mass along the surface, and including a first state representative of a target velocity in a first direction, a second state representative of deceleration in the first direction, a third state representative of acceleration in the direction reverse to the first direction, a fourth state representative of a target velocity in the direction reverse to the first direction, a fifth state representative of deceleration in the direction reverse to the first direction, and a sixth state representative of acceleration in the first direction; and generating a motor control signal representative of the movement signal, the motor control signal including a state for each state of the movement signal, with the first and fourth states being constant velocity signals, the second and fifth states being constant current signals of a first predetermined amplitude for decelerating the mass, and the third and sixth states being constant current signals of a second predetermined amplitude for accelerating the mass, the first predetermined amplitude being sufficiently less than the second predetermined amplitude to substantially compensate for the friction between the mass and the surface, whereby the mass decelerates and accelerates over substantially equal distances of the surface.

9. A method for reversing the direction of movement of a mass with friction along a predetermined surface by a motor responsive to a control signal and coupled to the mass, the method comprising the steps of:

moving the mass along the surface at a first velocity;

applying a torque of a first magnitude to the mass appropriate for decelerating the mass until the mass velocity is zero;

applying a torque of a second magnitude to the mass appropriate for accelerating the mass in a direction opposite to the first direction, the second magnitude being different from the first magnitude for compensating for friction between the mass and the surface.

10. A method according to claim 9 wherein the difference between the first and second magnitudes compensates for substantially all of the friction between the mass and the surface.

11. A method according to claim 9 wherein the first and second magnitudes are appropriate for equalizing substantially the distances the mass moves on the surface during deceleration and acceleration.

* * * * *